United States Patent
Knittel et al.

[19]

[11] Patent Number: 6,012,593
[45] Date of Patent: Jan. 11, 2000

[54] UNIVERSAL LID HOLDER

[76] Inventors: Richard D. Knittel, Rte. 4, Pinckard Pike, Versailles, Ky. 40383; David B. Kuhns, 756 Norman Camp Rd., Burgin, Ky. 40310

[21] Appl. No.: 09/128,281

[22] Filed: Aug. 3, 1998

[51] Int. Cl.[7] .................................................. A47F 7/00
[52] U.S. Cl. ...................... 211/41.11; D7/638; 211/181.1
[58] Field of Search ............................... 211/41.11, 41.1, 211/41.2, 41.3, 41.4, 181.1; 248/37.3; D7/637, 638

[56] References Cited

U.S. PATENT DOCUMENTS

| | | |
|---|---|---|
| D. 192,531 | 4/1962 | Guillaumant . |
| 265,635 | 10/1882 | Raughtigan et al. . |
| D. 297,489 | 9/1988 | Chap et al. . |
| D. 320,332 | 10/1991 | Fetty ........................................ D7/638 |
| 1,065,000 | 6/1913 | Sarter et al. ......................... 211/41.11 |
| 1,349,084 | 8/1920 | Moore . |
| 1,661,787 | 3/1928 | Chisholm . |
| 1,994,195 | 3/1935 | Hay ..................................... 211/41.11 |
| 3,028,972 | 4/1962 | Guillaumant . |
| 3,326,387 | 6/1967 | Princevalle . |
| 4,254,881 | 3/1981 | Hard .................................. 211/41.11 X |
| 4,515,332 | 5/1985 | Scharfy . |
| 4,577,764 | 3/1986 | Silka et al. ............................. 211/41.4 |
| 4,776,469 | 10/1988 | Geleziunas . |
| 4,790,503 | 12/1988 | Pohler . |
| 4,911,310 | 3/1990 | Raishe et al. . |
| 4,998,627 | 3/1991 | Elder . |
| 5,000,326 | 3/1991 | Vaughn . |
| 5,127,616 | 7/1992 | Carney . |
| 5,158,184 | 10/1992 | Craft et al. . |
| 5,396,993 | 3/1995 | Spitler ............................... 248/37.3 X |
| 5,660,284 | 8/1997 | Vaughn . |
| 5,683,010 | 11/1997 | Boyajian, Jr. . |

Primary Examiner—Robert W. Gibson, Jr.
Attorney, Agent, or Firm—King and Schickli

[57] ABSTRACT

A portable holder for lids of cooking vessels includes upstanding supports on a base with intermediate retainers. At least one face of the lid contacts the support. Spaces between the support and retainer are spanned by the lower edge of the lid. A lid of minimum thickness can fit in the space. The upper edge of the support is V-shaped and the upper edge of the retainer is semi-circular. The supports and retainers are removable for cleaning and storage.

14 Claims, 1 Drawing Sheet

UNIVERSAL LID HOLDER

TECHNICAL FIELD

The present invention relates to portable holders for articles, and more particularly, to a universal holder for lids of cooking vessels.

BACKGROUND OF THE INVENTION

During cooking, the lids of vessels, from the size of large pots to small pans, must be removed from time to time to test, stir and season the food. It has always been a problem of where to place the lid at this time so that both hands of the cook can be freed. The problem is made a more difficult one because the lid is hot and the hands can be easily burned unless precautions are taken. Furthermore, the lids have moisture on the underside due to the steam coming from the meats and vegetables being cooked, adding another dimension to the hazard.

In many instances, the cook tries to solve the problem by continuing to hold the lid in one hand by the handle, while trying to do the testing, stirring, seasoning and the like with the other hand. This is a very awkward procedure and becomes more difficult if the cook has to move away from the stove for some reason, and/or is temporarily interrupted during the procedure. If a plate or platter is used on the counter next to the stove, a substantial amount of counter space is in effect wasted.

Further, this method of dealing with the problem simply means that another dish has to be washed at the end of the meal. In order to avoid using an extra platter or plate, some cooks will simply try to balance the lid upside down on the handle, which as will be recognized is a precarious position. In this regard, the chances of burning the hands while trying to position the lid is greatly increased.

There have been attempts in the past to provide a portable holder for a lid or lids that can be placed on the counter adjacent to the stove. While the concept of such a holder is thus known, the previous approaches in this regard leave much to be desired. One such approach is illustrated in the patent to Pohler, U.S. Pat. No. 4,790,503 having a base and a fabricated wire rack extending upwardly from the base for a single lid. The rack requires the lid to rest on horizontal cross wires that are positioned relatively close together so that only relatively small lids can be accommodated. Even small lids are precariously perched on these cross wires making the slightest bump of the holder, or inadvertent mishandling during placement or pick-up of the lid, likely to cause the lid to become dislodged and fall on the counter or the floor.

Other inventors have approached providing a lid holder from other directions, such as shown in the Princevalle U.S. Pat. No. 3,326,387. In this case, the holder is made of sheet metal forming a tray with notches in the side walls where the extreme lower edges of the lids are to be positioned. As can be comprehended by viewing the design of this holder, the lids are not held in a secure manner. There is no component that engages the lid along its top face in a manner to keep it from having a tendency of slipping out of the notches, and thus falling. This holder of the '387 patent, like the holder in the '503 patent, thus limits the practical size of the lid that can be placed in it. Furthermore, the lids for this holder must be a particular design around the outer rim in order to fit within the notches, and is thus clearly not a universal holder. The instability of the lids is particularly precarious when the lids are attempted to be placed in a more upright orientation, as illustrated in FIG. 1 of the '387 patent.

Considering the above shortcomings of the prior art, what is needed is a portable lid holder that provides a more secure retention of the lids and is universal in so far as the size and shape of the lids that can be accommodated. Of course, the lid holder that is desired should be simple and low cost in design, thus making it more acceptable to use by cooks.

SUMMARY OF THE INVENTION

Accordingly, the primary object of the present invention is to provide an improved portable holder for lids of cooking vessels that overcomes the above described limitations and shortcomings of the prior art devices.

Another object of the present invention is to provide a lid holder that is designed for acceptance and secure positioning of a wide range of lids, making it universal in scope of use.

It is another object of the present invention to provide such a lid holder that is simple in design and inexpensive to manufacture, while at the same time being easy to clean and store.

Still another object of the present invention is to provide a lid holder that allows secure placement of the wide range of size and makes of lids, and either in a angled orientation or a substantially upright orientation, and which provides for easy positioning especially under rush conditions during cooking.

Another object of the present invention is to provide the lid holder that can easily accommodate multiple lids without compromising the secure retention of the lids on the holder.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of this invention, an improved portable lid holder is provided including a base and a plurality of upstanding supports mounted on the top surface of the base. While any number of supports can be utilized, in the preferred embodiment shown, three supports are mounted on the base and extend sufficiently above the surface to secure the lids. While there is more than one orientation of the lids when they are held in position, the usual orientation is at an acute angle leaning against one of the supports. Also, according to the present invention, a unique retainer extends between the supports to engage and secure the adjacent lower edge of the lid, with a space forming a gap between at least one side of the retainer and the adjacent support. This construction provides a way that a lid can be either secured by contact with the face of the support and with the lower edge spanning the space between the retainer and the support, or for large, thin lids, secured by actually being positioned in a more upright orientation within the space.

Preferably, the supports are fabricated of bent wire so as to be V-shaped along their upper edge. This shape advantageously accommodates a handle on the lid when the lid is leaning against the support. Considering the legs of the support that fit into holes in the base, the supports are overall M-shaped. The supports are wide, with the lateral edges extending substantially to the edge of the base so as to provide improved stability over similar prior art holders. In the preferred embodiment, the height of the supports is gauged so as to be at an optimum to hold a lid in position in either the upright or the acute angle orientation. Each of the retainers also extends to adjacent the edge of the base to provide maximum stability, and in the preferred embodiment the retainer is approximately ⅓ the height of the support.

The upper edge of the retainer in substantially semicircular, and like the support is fabricated of bent wire. The base includes a recess in the top surface for collecting moisture or other dripping from the lids. Like the support, each retainer is mounted in spaced holes, with the holes being positioned in a raised rim around the periphery of the base. The lateral spacing between corresponding mounting holes for both the support and the retainer is different from the unflexed legs of these components. The elastic memory in the wire forming the legs of each of the supports and retainers causes the holes to be tightly engaged so as to assure retention during use. This arrangement also allows both the supports and the retainers to be easily removed for cleaning and/or storage. For installation, the ends of the wire legs are simply flexed to match the spacing between the holes.

The holder of the present invention is particularly adapted for accommodating multiple lids at one time. The preferred embodiment includes three supports for lids, which inherently provides two different holder sections for holding lids, either leaning against the upper edge of the supports or in a substantially upright position extending down within the gap between the support and the adjacent retainer. Also with this arrangement, it will be realized that the lid can be placed either in a right hand or a left hand orientation within the holder for the convenience of the cook. In addition, if necessary, the relationship of the supports is such that multiple lids can be supported in a section, such as for example, a first lid positioned substantially upright within the gap between the support and the retainer, with a second lid leaning against the upper edge of the support on the opposite side of the section.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrate several aspects of the present invention, and together with the description serve to explain the principles of the invention. In the drawing.

Reference will now be made in detail to the present preferred embodiment of the invention, an example of which is illustrated in the accompanying drawing.

DETAILED DESCRIPTION OF THE PREFERRED EMBODIMENT

Figure 1:
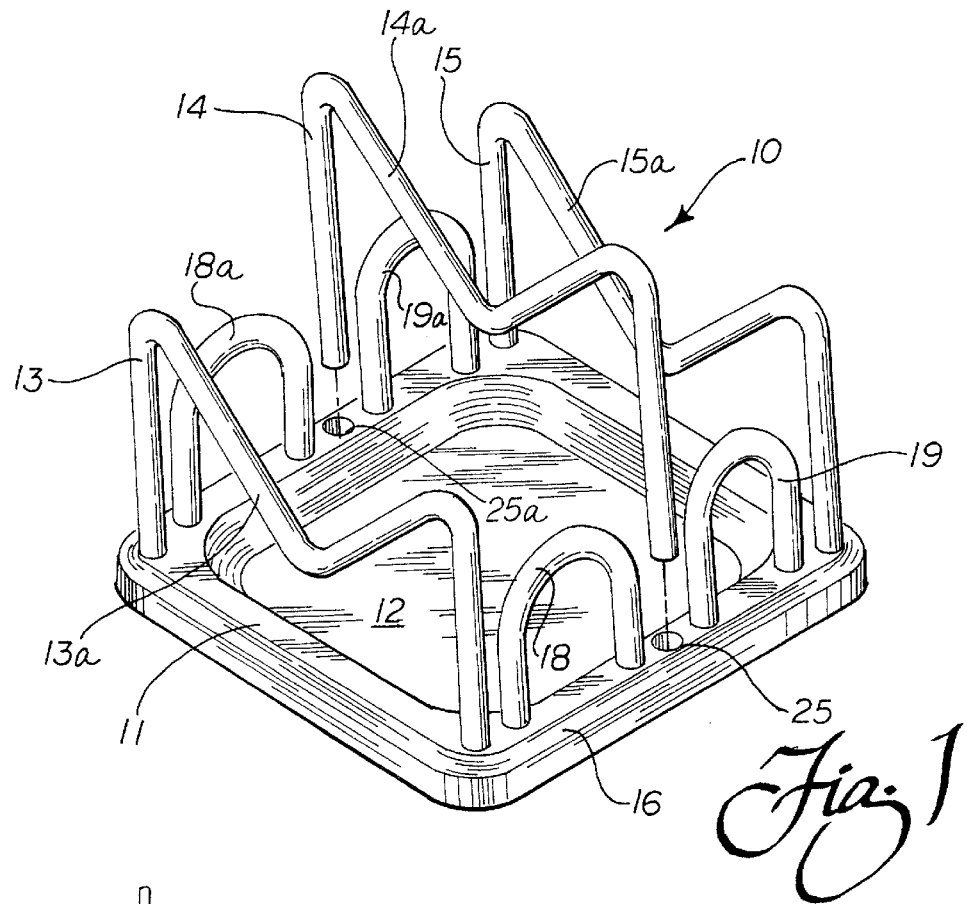
FIG. 1 is a perspective view of the portable lid holder of the present invention illustrating the supports and retainers mounted to the top surface of the base, and the manner in which these parts are removable for cleaning and storage.

Referring to FIG. 1 of the drawings, an improved portable lid holder 10 has a base 11 with a top surface including recess 12. A plurality of M-shaped upstanding supports 13, 14, 15 are mounted on a raised rim 16 of the top surface. The supports 13–15 extend sufficiently above the top surface in order to provide a secure leaning support for the lids $L_1$, $L_2$ and $L_3$ (see FIG. 2). As illustrated, when the holder 10 of the present invention is used with any one of the lids $L_1$–$L_3$, the actual contact with the lids is on the upper points of the V-shaped upper edge 13a, 14a and 15a (see FIG. 1). For added stability, each of the supports 13–15 extends all of the way to substantially the full lateral extent of the top surface of the base 11 (see FIG. 1). The two adjacent supports 13, 14 and 14, 15 provide two holding sections for virtually any size lids $L_1$–$L_3$, thus making the holder 10 universal in its use, and providing substantial increased capacity over the prior art lid rack of the '503 patent, mentioned above.

Intermediate the supports 13–14 and 14–15 and in each of the two side-by-side sections for holding lids, a pair of retainers 18, 18a and 19, 19a are installed. These retainers include a semicircular upper edge, extend between the supports 13–15 and are aligned along the lateral edges of such supports. In the preferred embodiment, spaces $S_1$, $S_2$, $S_3$, $S_4$ form gaps between each of the supports 13–15 and the adjacent retainers 18, 18a, 19, 19a; although within the broadest aspect of the present invention, the retainer can be integral with one of the supports so that only one space per section is provided. The space serves two important functions, the first of which is in the nature of improving the capability of the holder 10 to assure the stability of the lids $L_1$–$L_3$. Secondly, the space is formed such that thin lids can be held in the gap in substantially upright orientation between one of the supports 13–15 and the adjacent retainer 18, 18a and 19, 19a.

Figure 2:
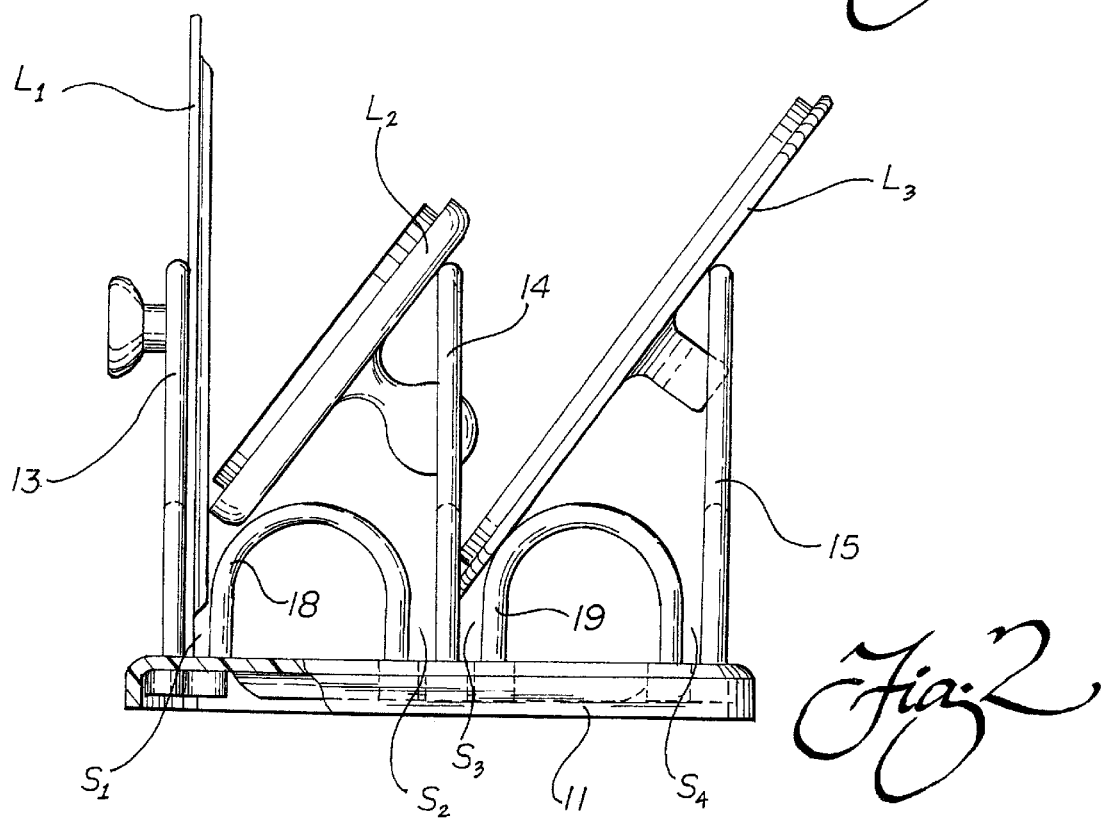
FIG. 2 is a side view of the portable lid holder illustrating the manner in which multiple lids can be positioned during use.

Thus, in use, a lid, such as the lid $L_3$ as shown in FIG. 2, can be secured on the holder 10 by leaning contact of its upper face against the support 15 as its lower edge spans and is nested in the space or gap (see FIG. 2). In a like manner, the lid $L_2$ is supported by the upper edge 14a of the support 14 by engaging the upper face of the lid, with the lower edge spanning the space or gap between the support 13 and the retainers 18, 18a.

Each of the pair of retainers 18, 18a and 19, 19a defining the two lid supporting sections of the holder 10 are aligned with the lateral edges of the adjacent supports 13, 14, and 14, 15, respectively. Preferably, the spaces $S_1$–$S_4$ are only wide enough to just receive and secure the lid $L_1$ in a substantially fully upright position, as mentioned above and clearly shown in FIG. 2. This is of advantage since the holder 10 can better accommodate thin, and large diameter lids in this manner. In addition, while the lid $L_1$ is so supported, the second lid $L_2$ can be supported in the same section by leaning on the middle support 14 with the lower edge spanning the same gap and resting in contact with the underside of the lid $L_1$.

As illustrated, the retainers 18, 18a and 19, 19a are approximately ⅓ the height of the adjacent supports 13–15. This has been found to be a preferred relationship in that the lids $L_2$, $L_3$ can be supported at an acute angle of approximately 45°–60° for maximum stability. Also, because the upper edges 13a–15a are V-shaped, the handles of the lids $L_1$–$L_3$ can be accommodated. Indeed, by being positioned within the V-shaped upper edge, each lid is held captive from moving off the holder 10 toward the sides.

Since the upper edges of the retainers 18, 18a and 19, 19a are semicircular, the lids are easily positionable by the cook and assume a downward, self-centering slide into the space, such as space $S_3$ for the lid $L_3$ of FIG. 2. In many instances a lid is removed from a cooking vessel in a hurry and this feature assists in positioning the lid without requiring the tedious task of moving it to an exact position. Once the lower edge of the lid $L_3$ nests in the space $S_3$ forming the gap, it is secure and not likely to be inadvertently dislodged.

The supports 13–15 and retainers 18, 18a, 19, 19a are fabricated of bent wire. The wire is preferably chrome plated for rust prevention, or it can be stainless steel, or other rust resistant metals or plastics, that are suitable for cooking related functions.

The legs of the supports 13–15 and of the retainers 18, 18a, 19, 19a are mounted in laterally spaced holes in the raised rim 16 of the base 12 (see FIG. 1). The holes 25, 25a are illustrated for the support 14, which is being shown in exploded format for clarity. The base 11 is preferably molded so as to be hollow underneath and includes sockets for forming the holes, such as the holes 25, 25a (see FIG. 2). During the manufacturing process, the tolerance of the bent wire forming the supports 13–15 and the retainers 18, 18a, 19, 19a may vary. In this instance, the lateral spacing between the holes, such as the holes 25, 25a, is slightly different from the unflexed spacing between the legs. This requires slight flexing during installation to align the ends of the legs with the holes 25, 25a. The resilient memory in the wire assures that the ends fit in the holes with increased friction, and thus provides reliable retention. On the other hand, this design allows the wire ends to be removed relatively easily by simply pulling upward while holding the base 11 down. This means that the entire lid holder 10 can be easily disassembled, rinsed or washed for cleanliness, and easily stored if desirable for periods of extended non use.

In view of the foregoing, the considerable favorable results and advantages of the portable lid holder 10 of the present invention can now be fully understood. The supports 13–15 and the retainers 18, 18a and 19, 19a are particularly advantageously positioned to securely hold multiple lids $L_1$–$L_3$ of virtually any size so as to make the holder universal in its use. The lids $L_1$–$L_3$ can be held by leaning against one of the supports 13–15 above the handle and having the lower edge span the gap provided by the corresponding space $S_1$–$S_4$. The M-shape of the supports 13–15 with the V-shaped upper edges 13a–15a provides particular effectiveness in holding the lids in place in combination with the lower edge of the lids spanning and nesting in the gap provided by the corresponding space $S_1$–$S_4$. In addition, thin and large diameter lids are easily accommodated by the substantially upright positioning within one of the gaps.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A portable holder for a lid for a cooking vessel comprising:

a base having a top surface;

a plurality of upstanding supports mounted on said surface;

each support extending sufficiently above said surface to secure a lid by contact with an upper portion of one face thereof;

a retainer extending between said supports to engage and secure the adjacent lower edge of said lid; and a space formed between said retainer and the adjacent support, whereby a lid can be secured on said holder by contact with said one face and said lower edge spanning said space.

2. A portable holder for a lid for a cooking vessel comprising:

a base having a top surface;

a plurality of upstanding supports mounted on said surface, the upper edge of said supports is V-shaped to accommodate a handle on the lid;

each support extending sufficiently above said surface to secure a lid by contact with one face thereof;

a retainer extending between said supports to engage and secure the adjacent lower edge of said lid; and a space formed between said retainer and the adjacent support, whereby a lid can be secured on said holder by contact with said one face and said lower edge spanning said space.

3. A portable holder for a lid for a cooking vessel comprising:

a base having a top surface;

a plurality of upstanding supports mounted on said surface;

each support including an M-shaped upper edge and extending sufficiently above said surface to secure a lid by contact with one face thereof;

a retainer extending between corresponding lateral edges of said supports to engage and secure the adjacent lower edge of said lid; and a space formed between said retainer and the adjacent support sufficient to fully receive and secure a lid in a substantially fully upright position, whereby a lid can be secured on said holder by contact with said one face and said lower edge spanning said space.

4. The holder of claim 1, wherein said retainer extends between corresponding lateral edges of said supports, said space being sufficient to fully receive and secure a lid in a substantially fully upright position.

5. The holder of claim 4, wherein is provided an additional retainer extending between the opposite lateral edges of said supports.

6. The holder of claim 1, wherein said retainer is approximately one-third the height of said supports so as to position said lid at an acute angle when spanning said space.

7. The holder of claim 2, wherein the upper edge of said retainer is substantially semi-circular.

8. The holder of claim 7, wherein said supports and retainer are fabricated of bent wire.

9. The holder of claim 8, wherein the ends of said supports and retainer are mounted in spaced holes in the surface of said base and removable for cleaning and storage.

10. The holder of claim 9, wherein said surface includes a recess for receiving liquid drippage from said lid and wherein said mounting holes are formed in a raised rim.

11. The holder of claim 9, wherein the lateral spacing between the corresponding mounting holes is different from the unflexed spacing between the ends of said wire forming said supports and said retainer, so as to assist in retention during use.

12. The holder of claim 1, wherein said plurality of said supports includes at least three, and a retainer extending between each of the adjacent lateral edges of said supports.

13. The holder of claim 2, wherein the upper edge of said supports is V-shaped to accommodate a handle on the lid, the contact of the lid face with the inside of said supports being provided at the upper points of the V.

14. The holder of claim 3, wherein said retainer is positioned to support a second lid on its upper edge when the first mentioned lid is secured in said space.

* * * * *